(12) United States Patent
Gibbs, Sr.

(10) Patent No.: US 6,477,929 B1
(45) Date of Patent: Nov. 12, 2002

(54) PICTURE FRAME MAKING ACCESSORY AND METHOD

(76) Inventor: Donald L. Gibbs, Sr., 2011 E. Lake Dr., Zellwood, FL (US) 32798

( * ) Notice: Subject to any disclaimer, the term of this patent is extended or adjusted under 35 U.S.C. 154(b) by 0 days.

(21) Appl. No.: 09/541,321

(22) Filed: Apr. 1, 2000

(51) Int. Cl.[7] ............................................. B26D 1/00
(52) U.S. Cl. ........................ 83/13; 83/581; 83/471.3; 83/522.19; 33/562
(58) Field of Search .................... 83/468, 581, 473, 83/490, 468.7, 522.17, 522.18, 522.19, 525.25, 471.3, 13; 144/287; 33/562–566, 640, 758, 494, 534

(56) References Cited

U.S. PATENT DOCUMENTS

| | | | |
|---|---|---|---|
| 3,527,131 A | * 9/1970 | Ellerin | 83/522 |
| 3,854,360 A | 12/1974 | Reed | |
| 3,901,498 A | 8/1975 | Novak | |
| 3,936,944 A | * 2/1976 | Byne | 33/137 R |
| 4,056,030 A | * 11/1977 | Hahn | 83/762 |
| 4,068,551 A | * 1/1978 | Kreitz | 83/471.3 |
| 4,193,331 A | * 3/1980 | Gathings | 83/468 |
| 4,219,061 A | 8/1980 | Duggins | |
| 4,341,247 A | 7/1982 | Price | |
| 4,403,423 A | * 9/1983 | Ford et al. | 33/432 |
| D273,193 S | 3/1984 | Stowe | |
| 4,603,612 A | * 8/1986 | Atkins | 83/425 |
| 4,646,801 A | 3/1987 | Hines | |
| 4,817,693 A | 4/1989 | Schuler | |
| 4,987,813 A | 1/1991 | Viazanco | |
| 5,038,650 A | 8/1991 | Hodge | |
| 5,040,443 A | 8/1991 | Price | |
| 5,105,862 A | 4/1992 | Skinner et al. | |
| 5,379,670 A | 1/1995 | Ferry | |
| 5,526,856 A | 6/1996 | Pedri | |
| 5,560,273 A | * 10/1996 | Keddie | 83/767 |
| 5,592,981 A | 1/1997 | Derecktor | |
| 5,768,966 A | * 6/1998 | Duginske | 83/468 |

* cited by examiner

Primary Examiner—Kenneth E. Peterson
Assistant Examiner—Omar Flores Sańchez
(74) Attorney, Agent, or Firm—John V. Stewart (57) ABSTRACT

An elongated horizontal extension table for miter saws for cutting molding for the sides of equiangular polygonal frames such as picture frames. The extension table has upper and lower surfaces, first and second ends, front and back edges, a hinge on the lower surface at the first end, a vertically adjustable support leg on the lower surface at the second end, and a vertical fence along the back edge. A simple stop arm extends obliquely across the upper surface of the table from the front edge to the fence and angled toward the first end of the extension table. The stop arm has a clamp that wraps around the front edge of the table, and also serves as a releasable slide for the arm. The extension table is attached to the frame of a miter saw by the hinge, and is aligned with the miter saw table by adjusting the length of the support leg. A template with angled scale lines is adhered to the horizontal surface of the extension table. A method is provided for easily cutting molding accurately at a given angle, to a length measured between any two respective points on the finished ends of the molding. Additional templates are provided with different angles of scale lines for accurately cutting sides for non-rectangular polygonal frames.

9 Claims, 6 Drawing Sheets

PICTURE FRAME MAKING ACCESSORY AND METHOD

BACKGROUND OF THE INVENTION

1. Field of the Invention

This invention relates to accessories and methods to make frames for pictures, mirrors, and the like, including rectangular and other polygonal frame shapes.

2. Description of Prior Art

Various prior inventions address the problem of cutting accurate picture frame corner joints in molding. However, none of them have the simplicity of the present invention, and most of them do not have the flexibility to make square, rectangular, and non-rectangular polygonal picture frames, plus door frames.

U.S. Pat. No. 5,040,443—Multiple Angle Measuring Gauge—shows an extension table attached to a miter chopper. A template having a scale with 45-degree angled lines is adhered to the horizontal surface of the extension table. A 90-degree ruled scale is adhered to a specialized back fence on the table. A sliding stop assembly on the specialized fence in this invention is much more complex than the simple stop arm of the present invention.

U.S. Pat. No. 4,193,331—Adjustable Measuring Guide Attachment for a Picture Frame Mitering Apparatus—shows a graduated measuring strip adhered to a miter table extension. The scale lines on the strip are marked at a 45-degree angle for rectangular picture frames. A compound sliding arm assembly stops the molding at a desired chop length of the rabbet groove. The arm assembly has four interconnected slidable parts, each of which is more complex than the complete stop arm and clamp of the present invention. In addition, a retainer bar and C-clamp are needed to fasten the stop arm of U.S. Pat. No. 4,193,331 to the extension table. In contrast to the present invention, this apparatus can only produce rectangular frames.

U.S. Pat. No. 4,219,061—Miter Chopper Attachment for Measuring Picture Frame Molding—has an arm that slides along a fence of a miter saw table and locks in position with a knob to hold molding in position for cutting to a desired length. This arm is much more complex than the stop of the present invention. This design does not provide flexibility in the number of sides of a frame.

SUMMARY OF THE INVENTION

The main objectives of the present invention are provision of picture frame making accessory that can be attached to an existing miter saw, and a method for using it to cut accurate corner joints in molding for rectangular picture frames. A further objective is means to cut molding accurately for equiangular polygonal frames with a selectable number of sides, such as hexagonal, octagonal, and triangular. A further objective is means to cut molding accurately for doorframes. Other objectives include simplicity of use and low manufacturing cost.

These objectives are achieved in an elongated extension table for miter saws. The extension table has upper and lower surfaces, first and second ends, front and back edges, a hinge on the lower surface at the first end, an adjustable support leg on the lower surface at the second end, and a vertical fence along the back edge. A simple stop arm extends obliquely across the upper surface of the table from the front edge to the fence, angled toward the first end. The stop arm has a simple integrated clamp that wraps around the front edge of the table, and serves as a releasable slide for the arm. The extension table is attached to the frame of a miter saw by the hinge, and is aligned with the miter saw table by adjusting the length of the support leg. A template with angled scale lines is adhered to the horizontal surface of the extension table. A method is provided for easily cutting molding accurately at a given angle, to a length measured between any two respective points on the finished ends of the molding. Additional templates are provided with different angles of scale lines for accurately cutting sides for non-rectangular polygonal frames.

REFERENCE NUMBERS

1. Extension table
1a. Horizontal portion of extension table
1b. Vertical portion or fence of extension table
1c. Front edge of extension table
2. Attachment hinge
2a. Oversized hole for bolt
3. Bolt for attaching hinge to miter saw frame
4. Nut
5. Bolt for attaching hinge to extension table
5a. Nut for attaching hinge to extension table
6. Threaded shaft of adjustable support leg
7. Lock nut
8. Elongated adjustment nut of support leg
10. Slidable lockable stop arm
10a. Tip of stop arm
10b. Lower slide plate of stop arm
10c. Wing screw
11. Template
12. 10-inch line on template
14. Intersection of 10-inch line and outer edge of rabbet
15. Tape holding template to extension table
20. Miter saw turntable
21. Miter saw cutting slot
22. Miter saw angle scale
23. Miter saw pivot handle
24. Miter saw left side table
25. Miter saw right side table
26. Miter saw left fence
27. Miter saw right fence
28. Miter saw frame 29. Miter saw foot
30. Molding for picture frame
33. Outer edge of rabbet groove

TERMINOLOGY

"Equiangular polygonal frame" means an enclosed frame in the form of a polygon with all vertex angles equal. This does not mean all the sides have equal length. For example, a rectangular frame is equiangular but not necessarily equilateral. Certain other polygons can also have this characteristic.

An example of a non-rectangular picture frame that is equiangular but not equilateral is an octagon whose top and bottom sides are elongated horizontally and/or whose left and right sides are elongated vertically. The present invention and method produces accurate sides for any equiangular polygonal frame for which a template is provided with the appropriate vertex angle as described herein.

"Picture frame" is used in the description and claims in place of "equiangular polygonal frame" to make the description and claims easier to read. This is not intended to limit the use of the invention to picture frames. It can be used to make other types of border frames, such as mirror frames, a molding around a tabletop, and generally any type of border frame. The device can also be used for doorframes, as described herein.

DETAILED DESCRIPTION

Figure 1:
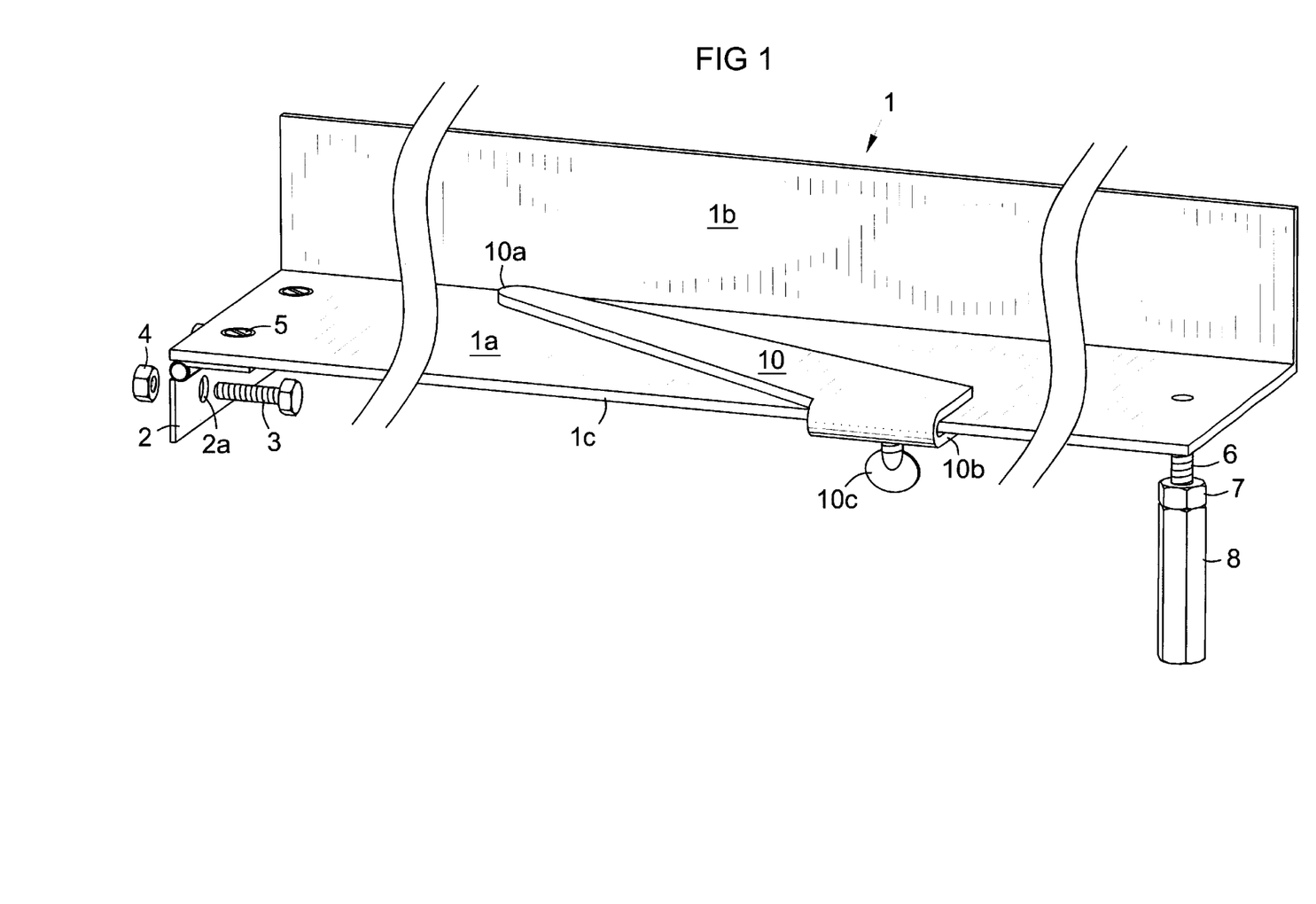
FIG. 1 is a perspective upper front view of the extension table portion of the invention.
Figure 2:
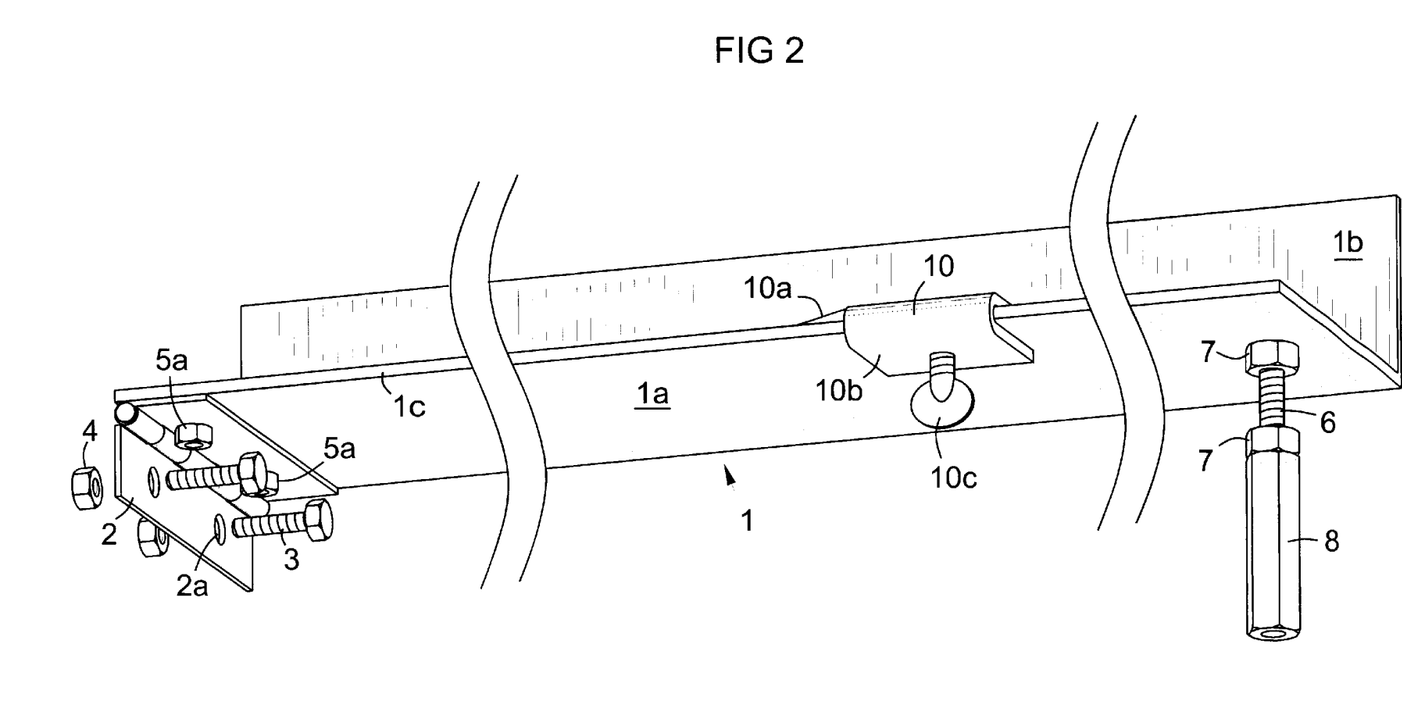
FIG. 2 is a perspective lower front view of the extension table portion of the invention.
Figure 4:
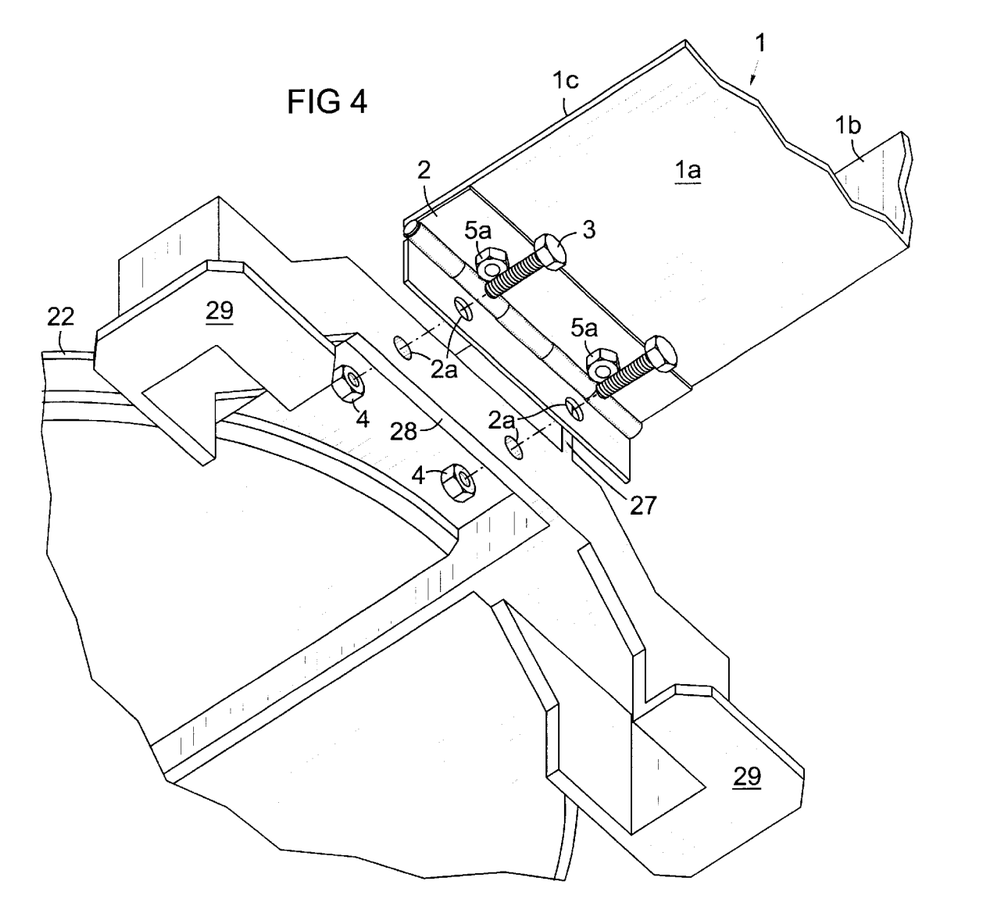
FIG. 4 is a perspective lower view of the extension table attachment to the miter saw frame.

FIGS. 1 and 2 show an extension table 1 for picture frame making on a miter saw. A hinge 2 connects the extension table 1 to the miter saw frame as shown in FIG. 4. The hinge allows the user to accurately align the extension table with the miter saw table during installation. A support leg 6, 8 holds the distal end of the extension table at an adjustable height to align it with the miter saw table.

A slidable stop arm 10 of very simple construction is used in the present frame making method. The stop arm has a slide portion that wraps around the front edge 1c of the extension table. A lower plate 10b of this slide portion has a hand-operated set screw, such as a wing screw 10c. This screw releasably fixes the arm at a selected position along the extension table. The stop arm extends transversely obliquely across the upper surface of the extension table as shown. Its oblique and elongated shape allows the tip 1a of the stop to extend over the miter saw table to reach short pieces of molding that do not reach the extension table.

Figure 5:
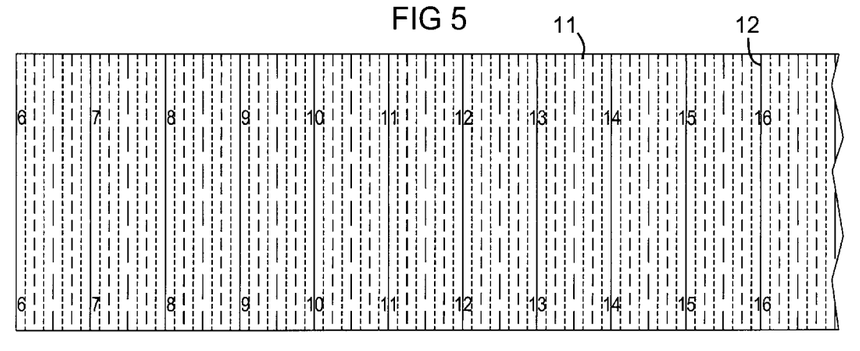
FIG. 5 is a partial upper view of a 90-degree template for square end cutting and general length measuring.
Figure 6:
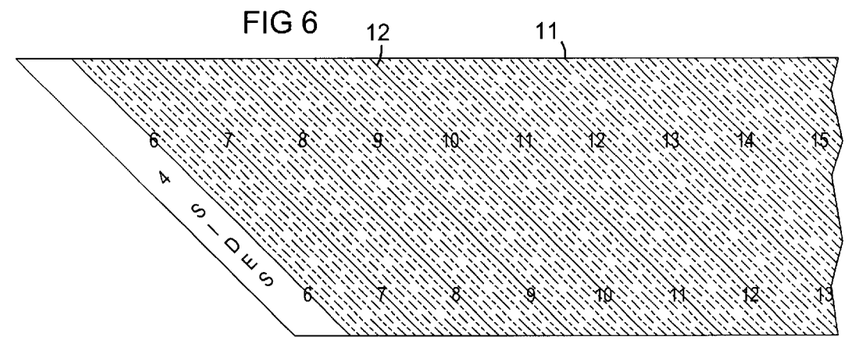
FIG. 6 is a partial upper view of a 45-degree template for rectangular frame making.
Figure 7:
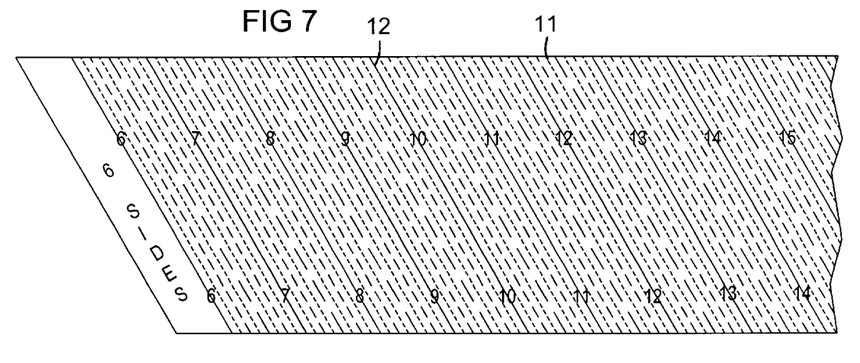
FIG. 7 is a partial upper view of a 30-degree template for hexagonal frame making.
Figure 8:
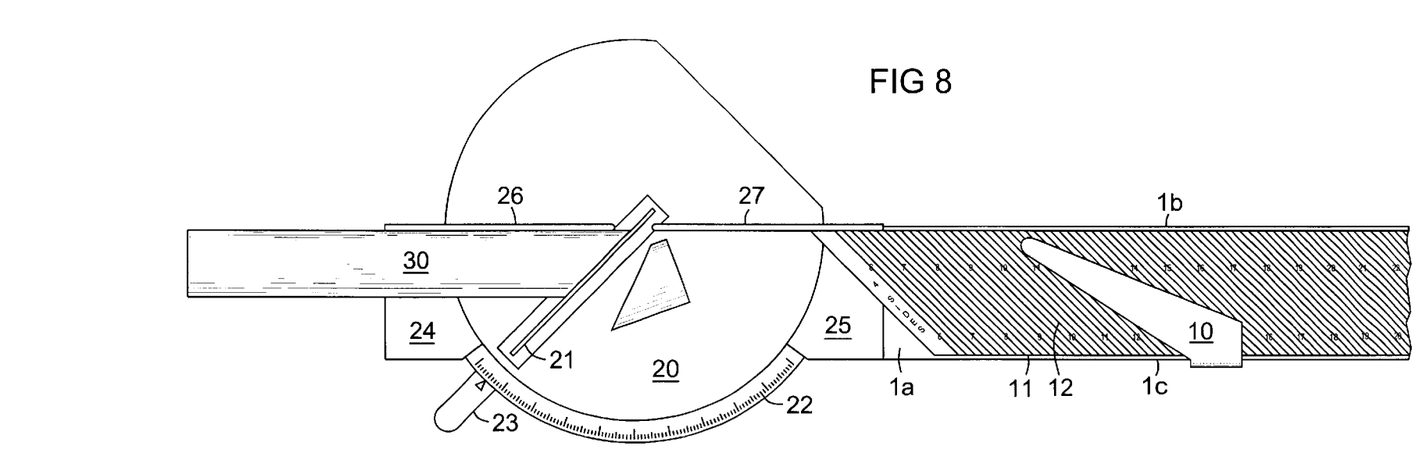
FIG. 8 is a top view of the invention after cutting the right end of a piece of molding.
Figure 9:
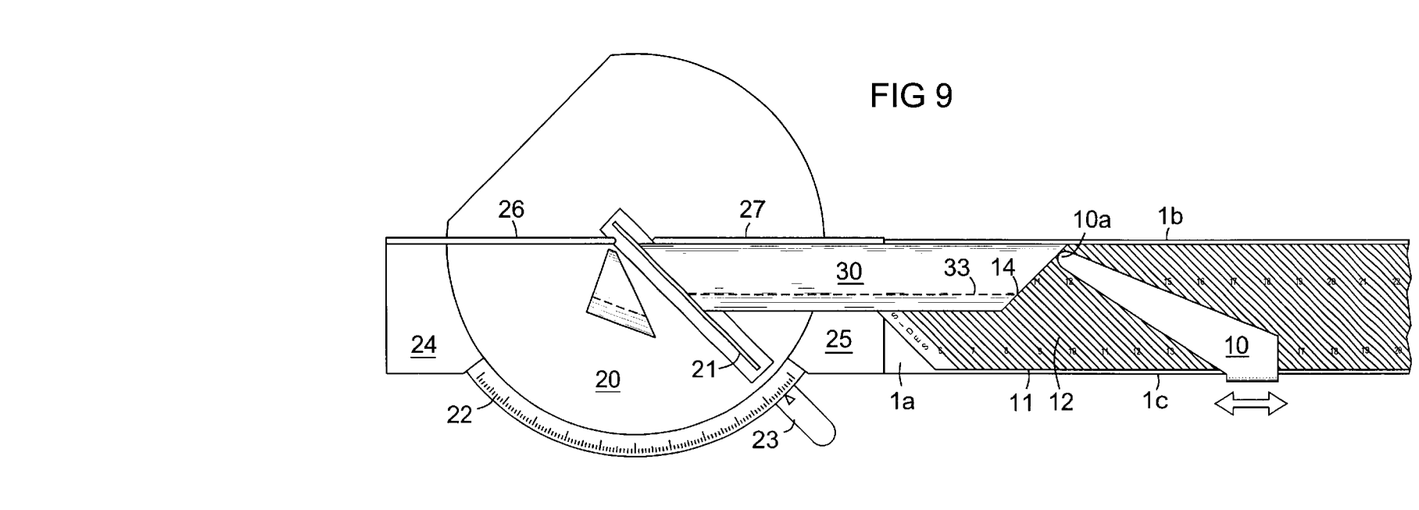
FIG. 9 is a top view of the invention after cutting the left end of a piece of molding.

A set of interchangeable templates 11 is provided to guide the cutting of frame molding at a desired angle and to a chosen length measured between selected respective points on the ends of the final molding. Three examples are shown in FIGS. 5–7. These templates are removably attached to the upper surface of the extension table, and can be changed for cutting different end angles. A set of templates is preferably selected from the following options. The angles here are measured from a line perpendicular to the back and front edges of the template, to be consistent with the angle scale on a miter saw. These angles are half the interior angle of a vertex for each polygon, and are calculated as $A=(180/N)$, where N is the number of sides.

| Square ends | 0 degrees |
| --- | --- |
| 4 sided frame | 45 degrees |
| 5 sided frame | 36 degrees |

-continued

| 6 sided frame | 30 degrees |
| --- | --- |
| 8 sided frame | 22.5 degrees |
| 10 sided frame | 18 degrees |
| 12 sided frame | 15 degrees |

Figure 3:
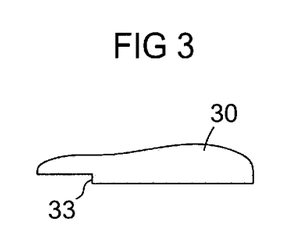
FIG. 3 is a cross section of molding of a type used for picture frames.

A sectional view of frame molding 30 is shown in FIG. 3 of a type used to border and protect a picture or work of art. Normally a rabbet groove 33 is provided in this molding deep enough to accept the picture or work of art, and possibly a transparent cover and/or a backing mat. The outer edge of the rabbet groove 33 is usually the desired point for measuring the length of the molding in order to fit the rabbet groove around the picture or art work. However, other types of frames, such as door frames and tabletop frames, may be measured between other respective positions on the ends of the molding, any of which are accommodated by the present apparatus and method.

Attachment of the extension table 1 to the miter saw frame 28 is shown in FIG. 4. The hinge may be detached from the extension table during this step. Drill two holes through the hinge and the miter saw base. The holes should be slightly larger in diameter than necessary for the bolts 3, in order to provide play for adjusting the alignment of the extension table. Attach the hinge to the extension table with bolts 5, and to the miter saw frame with the bolts 3 and hand tighten only.

Align the upper surface of the extension table 1a and its fence 1b flush with the table 25 and the fence 27 of the miter saw, then tighten the two bolts 3 holding the hinge to the saw frame. Turn the miter saw upright. Hold a straight edge horizontally on the miter saw table extending along the upper surface of the extension table. Adjust the length of the support leg 8 to obtain clearance between the straight edge and the extension table of 1/64 inch at the distal end. Tighten the lock nut 7 against the elongated adjustment nut 8 on the support leg.

Place a straight edge against the fence 27 of the miter saw, extending along the fence 1b of the extension table. Move the free end of the extension table forward or back to obtain a clearance of 1/64 inch between the straight edge and the extension fence at the free end. Tighten the two bolts 5 holding the extension table to the hinge. To adjust and set a template cut a piece of wood ¾ inch by 2 in. by 16 inches. Swing the miter saw head to the left 45 degrees, place the wood on the left side of the table, and cut the right end of the wood with the miter saw. Slide the wood to the right side of the table, swing the miter saw head to the right 45 degrees and cut the left end of the wood. Measure the length of the wood from toe to toe (the points of the ends). Lay the 45 degree template on the extension table surface. With the saw head to the right 45 degrees, lower the blade and butt the left end of the wood against the blade. Slide the 45 degree template under the wood. Adjust the template position so that the measured toe length on the template is underneath the right toe of the wood. Tape the template against the miter saw table and or the extension table.

Place a vertical mark on the fence of the extension table upward from any convenient scale line on the template. This is the calibration mark for this template. Label the calibration mark per the template line used. Now this template can be removed in order to use a another template, and this template can then be returned to its accurate position using the calibration mark.

To make a four sided frame, start with four pieces longer than required for the finished frame. Swing the miter saw head to the left 45 degrees and cut the right end of each piece on the left side of the table as in FIG. 4. Swing the miter saw head to the right 45 degrees. Place one of the frame sides on the right side of the table. Align any chosen point on the right end of the wood with the scale line on the template corresponding to the desired length at that point on the frame. For example, if an artwork to be framed is 16 inches square you might align the outer edge of the rabbet groove with 16 and 1/8 inches on the template. Slide the stop until it's tip 10a touches the right end of the wood and lock the stop. Cut the left end of the wood with the saw as in FIG. 5. The outer edge of the rabbet groove will now measure 16 and 1/8 inches between the mitered ends of the wood. The artwork will fit in the rabbet groove of the finished frame with 1/8 inch clearance.

Cut the opposite side of the frame using the same stop position. If all four sides are the same length, then all four pieces are cut using the same stop position. If not, then each pair of opposed sides are cut using a given stop position.

For other polygonal frames, a different template is used for each type of polygon. For a regular polygon, all sides are cut to the same length. In polygons with an even number of sides, opposite sides are cut to the same length, but one or more pairs of opposed sides may have a different length from the other sides, depending on the polygon. Each template must be initially calibrated to the extension table as described above. Subsequent changes of templates are simple alignments with the calibration mark for that template.

Figure 10:
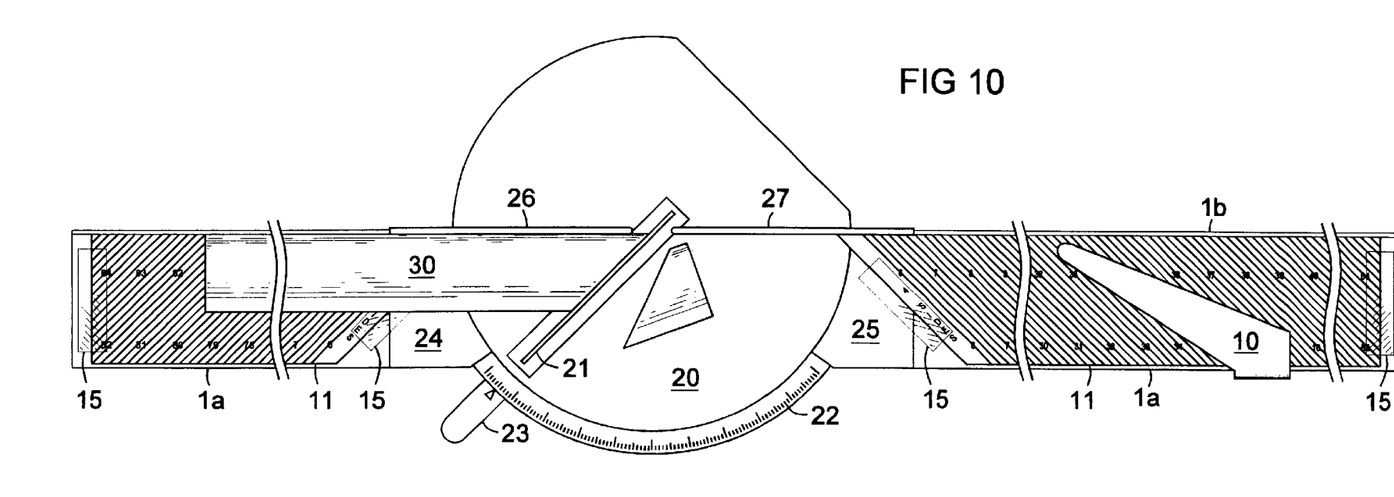
FIG. 10 is an arrangement of the invention for making door frames, providing both left and right extension tables.

FIG. 10 shows an arrangement for making doorframes. An extension table 1 with a 45-degree template is provided on both the left and right sides of the miter saw in mirror image arrangement of the extension table assemblies and the template lines. The left side of the doorframe is cut on the left extension table only. The right side of the frame is cut on the right extension table only. The molding length is measured at the inside edge of the molding using the template. The top section of the doorframe is cut on both ends as previously described, to a desired length of the inside edge. The left and top sides of the frame should be cut on the left side of the extension table first, then the saw should be pivoted to the right, and the left end of the top of the frame, and the top end of the right side of the frame are cut on the right extension table. A stop arm 1 can also be provided on the left extension table if production of multiple doorframes is needed.

The length of the extension table(s) is up to the product designer to allow for the maximum length of molding to be cut.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. A picture frame making method for miter saws, comprising the steps of:

a) providing an elongated extension table having an upper surface, a lower surface, left and right ends, and a set of interchangeable templates with scale lines;

b) attaching the left end of the extension table to the right side of a miter saw frame;

c) selecting a template from the set of interchangeable templates, and adhering the selected template to the upper surface of the extension table;

d) providing a slidable stop on the extension table;

e) pivoting the miter saw head left to a selected angle A;

f) placing a piece of molding on the left side of the miter saw and cutting the right end of the molding with the miter saw;

g) pivoting the miter saw head right to said angle A;

h) placing the molding on the right side of the miter saw, and aligning a selected point on the right end of the molding with a first selected scale line on the template;

i) positioning the stop arm against the right end of the molding;

j) cutting the left end of the molding with the miter saw;

whereby a piece of frame molding is accurately cut at a selected angle on each end, and is accurately cut to a given length measured between selected respective points on the ends of the molding.

2. The picture frame making method of claim 1, wherein step b) comprises the steps of:

b1) providing a hinge having first and second plates connected together by a pivot journal;

b2) providing a first and second set of bolts and respective nuts;

b3) attaching the first plate of the hinge to the lower surface of the extension table at the left end thereof with the first set of bolts in a respective first set of holes through the extension table and through the first plate of the hinge, the first holes in the first plate of the hinge having clearance around the first bolts;

b4) positioning the second plate of the hinge on the right side of a miter saw frame;

b5) drilling a second set of holes larger than the diameter of the second bolts through the second plate of the hinge and through the right side of the miter saw frame;

b6) inserting the second bolts through the holes in the second plate of the hinge and through the holes in the right side of the miter saw frame, and partially tightening the nuts on the second bolts.

b7) adjusting the alignment of the extension table relative to the miter saw frame by moving the extension table in the range of the clearance between the second holes and the second bolts;

b8) fully tightening the nuts on the second bolts;

b9) further adjusting the alignment of the extension table relative to the miter saw frame by moving the extension table in the range of the clearance between the first holes and the first bolts; and, b10) further providing a vertically adjustable support leg on the lower surface on the right end of the extension table, and further adjusting the alignment of the extension table relative to the miter saw frame by adjusting the height of the support leg;

whereby the extension table can be easily installed on an existing miter saw frame via the hinge and accurately aligned by a user.

3. The picture frame making method of claim 1, wherein step f) is repeated for additional pieces of molding, and further comprising the steps of:

k) placing each said additional piece of molding individually on the right side of the miter saw with the right side of the additional piece of molding against the stop arm; and l) cutting the left end of the additional piece of molding with the miter saw; whereby additional identical frame sides are produced for making one or more equilateral polygonal frames.

4. The picture frame making method of claim 1, wherein said angle A is 45 degrees, step f) is repeated for 3 additional pieces of molding, and further comprising the steps of:

k) placing a first of said additional pieces of molding on the right side of the miter saw with the right side of the first additional piece of molding against the stop arm;

l) cutting the left end of the first additional piece of molding with the miter saw;

h) placing a second of said additional pieces of molding on the right side of the miter saw, and aligning a selected point on the right end of the molding with a second selected scale line on the template;

m) repeating steps i), and j) for the second additional piece of molding;

n) placing a third of said additional pieces of molding on the right side of the miter saw with the right side of the third additional piece of molding against the stop arm; and o) cutting the left end of the third additional piece of molding with the miter saw;

whereby two pairs of matching frame sides are produced for making a rectangular picture frame.

5. A picture frame making accessory kit for miter saws, comprising:

a first elongated extension table, with an upper surface, a lower surface, a front edge, a back edge, and first and second ends;

a fence extending upward along the back edge of the first extension table;

an adjustable-length support leg attached to the second end of the first extension table;

a set of interchangeable templates, including a first template with a sequence of parallel scale lines removably attached to the upper surface of the first extension table;

a stop arm reaching obliquely across the upper surface of the first extension table from the front edge thereof to the fence and angled toward the first end thereof;

a lower slide plate beneath the front edge of the first extension table, the slide plate attached to the stop arm, creating a bracket around the front edge of the table;

a mechanism for releasably locking the front edge of the first extension table within the bracket to fix the stop arm at a selected position along the front edge of the first extension table;

whereby the stop arm is slidable along the front edge of the first extension table, and is releasably fixed thereto.

6. The picture fame making accessory kit of claim 1 wherein each template of the set of interchangeable templates has a back edge and a sequence of parallel scale lines drawn at an angle selected from the set A=(180/ N) relative to a line perpendicular to the back edge of the template, for producing equiangular polygonal frames with N sides.

7. The picture frame making accessory kit of claim 5, further comprising;

a hinge having first and second parts connected together by a pivot journal;

the first part of the hinge attached to the lower surface of the first extension table at the first end thereof.

8. The picture frame making accessory kit of claim 7, wherein the first extension table is attached to a miter saw frame by bolts in bolt holes through the second part of the hinge and through a portion of the saw frame, the bolt holes having clearance around the bolts, whereby alignment of the upper surfaces of the first extension table and the miter saw frame can be adjusted.

9. The picture frame making accessory kit of claim 8, further including a second extension table assembly, including a second elongated extension table, a second fence, a second hinge, and a second adjustable support leg, the second extension table assembly being substantially a mirror image of the respective elements of the first extension table about a mirror normal to the front edge of the first extension table, the second extension table having a second template that is substantially a mirror image of the first template, and the second extension table is attached to the opposite side of the miter saw frame from the first extension table.

* * * * *